Jan. 7, 1969 L. SARATI 3,421,145

ELECTRONIC PROCESSOR WHICH PERFORMS SWITCHING OPERATIONS BETWEEN PLURAL TRANSMITTERS IN RESPONSE TO CIRCUIT CONDITIONS

Filed Aug. 4, 1965

INVENTOR
Luigi Sarati
BY Young & Thompson
ATTORNEYS 3,421,145

ELECTRONIC PROCESSOR WHICH PERFORMS SWITCHING OPERATIONS BETWEEN PLURAL TRANSMITTERS IN RESPONSE TO CIRCUIT CONDITIONS

Luigi Sarati, Milan, Italy, assignor to Società Italiana Telecomunicazioni Siemens S.p.A.

Filed Aug. 4, 1965, Ser. No. 477,195
Claims priority, application Italy, Aug. 4, 1964, 17,024/64
U.S. Cl. 340—147 4 Claims
Int. Cl. H04q *1/00*

This invention is concerned with a system of protection for telephone or television connection—the latter being constructed with medium or large capacity radio bridges. In particular, this invention relates to a computer which enables switching operations to be performed in transmitting stations constructed according to supply-reserve transmission technique.

To clarify the aims that the computer in question should fulfill, reference is made to the normal practice followed in "supply-reserve" hertzian connections. In such connections the number of devices is always doubled and they are all continuously in operation—so that, if there is trouble in one apparatus, the reserve apparatus takes over immediately.

If, for simplicity's sake, a single portion of these connections is considered it will be seen that each station is made up of two transmitters and two receivers connected as required to the transmitting system and the multiplex apparatus. To construct these connections, two quite different techniques have been developed according to what is required of the connection itself. One of these techniques, known as "different frequency," requires supply-reserve apparatuses which work on different frequencies. Thus the frequency of one transmitter is different from that of the other. And in this case, since both transmitters can be connected to the same antenna (through suitable separation filters), it must be possible to trace and single out an individual alarm signal when either of the transmitters is defective.

When, however, there are a limited number of working frequencies available, the technique of the so-called "isofrequential" system must be adopted. This means that the two transmitters work on the same cable and their outputs can be connected to the same antenna through a suitable radio-frequency switch device. In this case (FIG. 1) the "CT" signal from the multiplex apparatus is sent—through a fork $B_r$—to the inputs of the two hertzian transmitters $TR_1$, $TR_2$, both of which thus amplify the same basic band, modulating their own cables.

In the output, as has already been suggested, a suitable $K_r$-antenna RF switch allows only one of the isofrequential transmitters to be connected to the central transmitter—disconnecting the other at the same time from the antenna and the first transmitter.

To guarantee the continuity of the hertzian connection, in this case a control device must be arranged in the transmission. This serves to trace and signal eventual trouble, passing the information to a logical computer "ET." On the basis of such information and according to a prefixed circuit, the computer will, if necessary, activate the $K_r$-antenna RF switch. In this way, the switch in transmission is directly controlled by the transmitters' working condition.

For switch operations in transmission to be as reliable as possible, the control units must be able to communicate the following alarm conditions:

$C_j$=lack of continuity in amplifying circuits in transmission (an alarm is obtained by using a pilot-tone continuity receiver connected in parallel to the modulator input).

$W_j$=a drop below the prefixed limit for the power transmitted (in general for a power drop larger than 6 db with respect to the nominal value).

On the basis of such information, the transmitting computer circuit—if it is to ensure the best possible working conditions in the system—must be made in the light of the following requirements:

(1) The two transmitters should be identical and the computer should treat each transmitter in exactly the same way. Thus the transmitters need not be distinguished by definition as "supply" or "reserve" since they must be able to fulfill the same functions without priority conditions.

(2) Any trouble in the working transmitter must cause a shift of the antenna switch onto the other transmitter—as long as the latter is in working order. If necessary, therefore, one transmitter must be able to take over from the other as quickly as possible and then go on working normally.

(3) When there is trouble in both transmitters, the computer must be able to give a general alarm signal $A_r$, which is signaled externally.

(4) It must be possible to command a switchover in transmission from the receiver (by means of a command T), whichever transmitter is connected to the antenna. This is necessary only when the computer finds both transmitters are working—because of faulty control units. Requirement 4 thus means that switching can be controlled by the receiving section of the hertzian connection concerned if there is trouble in transmission as well as trouble in the broken down transmitter's control units.

Technical progress has not thus far produced electronic computers capable of fulfilling such a requirement.

A principal object of the present invention is to provide a solid-state electronic computer that can carry out transmitter switching in an isofrequency hertzian system according to the above requirements.

Another object of this invention is to provide a computing circuit made up of few working elements—so that its construction is simple and cheap and operates reliably.

Further objects of the invention will be seen more clearly from the following description of a preferred embodiment thereof. Reference is made to the attached drawings, in which.

The technique followed in developing this electronic computer is based on logic circuits, in particular, the type of logical circuit known as "NOR" has been preferred as it enables all the logical functions to be carried out. As working elements, preference has been given to silicon semiconductors.

Figure 1:
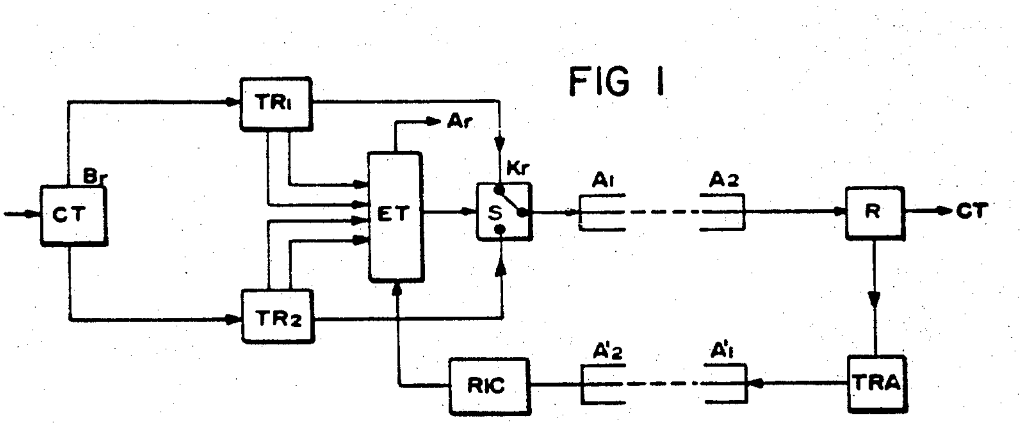
FIGURE 1 represents a block diagram of the arrangement of circuit elements in the transmitting section of an "isofrequency" hertzian connection in accordance with the present invention.

Referring to the isofrequency hertzian connection in FIGURE 1, and referring to signals with too little power as $W_1$ and $W_2$, signals, that is, from the transmitters $TR_1$ and $TR_2$, and signals indicating that the two transmitters are working (i.e., continuity of the television signal), $C_1$ and $C_2$, then the transmission processor or computer ET will be conditioned by two pairs of signals $W_1$, $C_1$ and $W_2$, $C_2$ coming from the two transmitters and present at the computer's inputs. On the basis of these pairs of signals present at its inputs, the computer's output signals will provide for the sending of a command to the $K_r$ switch of the $A_1$ antenna—if there is trouble in one of the two transmitters. If both transmitters are broken down, it will send out an alarm signal.

There will thus be three possible situations indicated by the computer: alarm; channel 1 switched to channel 2; channel 2 switched to channel 1.

The computer ET's three working conditions may be expressed by the following logical equations:

$$\text{Alarm } AT=(W_1+C_1)\cdot(W_2+C_2) \qquad (1)$$

$$\text{Switch } h_1=(W_1+C_1)\cdot(\overline{W_2+C_2})$$

or by Morgan's theorem $$=(W_1+C_1)\cdot(\overline{W_2}\cdot\overline{C_2}) \qquad (2)$$

$$\text{Switch } h_2=(W_2+C_2)\cdot(\overline{W_1+C_1})$$

or $$=(W_2+C_2)\cdot(\overline{W_1}\cdot\overline{C_1}) \qquad (3)$$

Figure 2:
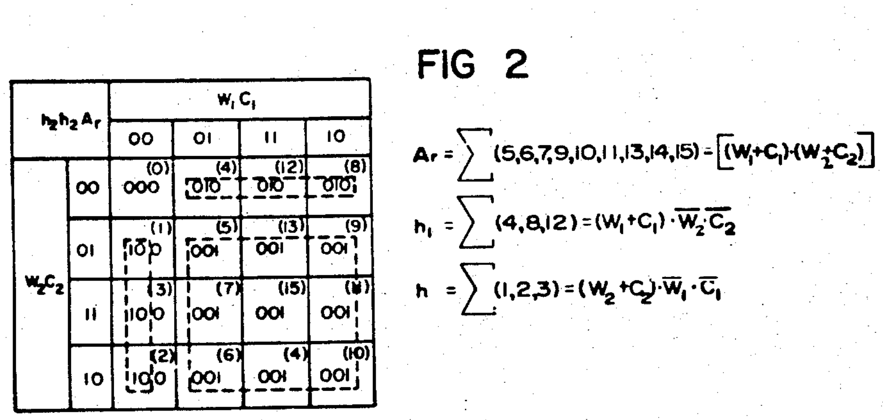
FIGURE 2 is a table of Karnaugh map representing the relations between inputs and outputs of the transmission processor ET ("isofrequency" connection).

Using Karnaugh's map (FIG. 2), which allows us to represent in a table the relationships between the computer's inputs and outputs, we have the computer's three working conditions defined by areas within the dotted lines:

ALARM area $A_t=\Sigma(5, 6, 7, 9, 10, 11, 13, 14, 15)$
SWITCH area $h_1=\Sigma(4, 8, 12)$
SWITCH area $h_2=\Sigma(1, 2, 3)$ the remainning area in the table defines the computer's condition when the hertzian connection is working normally.

The description of the make-up and the working of the transmission computer ET, as mentioned above, is only for use in an isofrequency type of connection.

Figure 3:
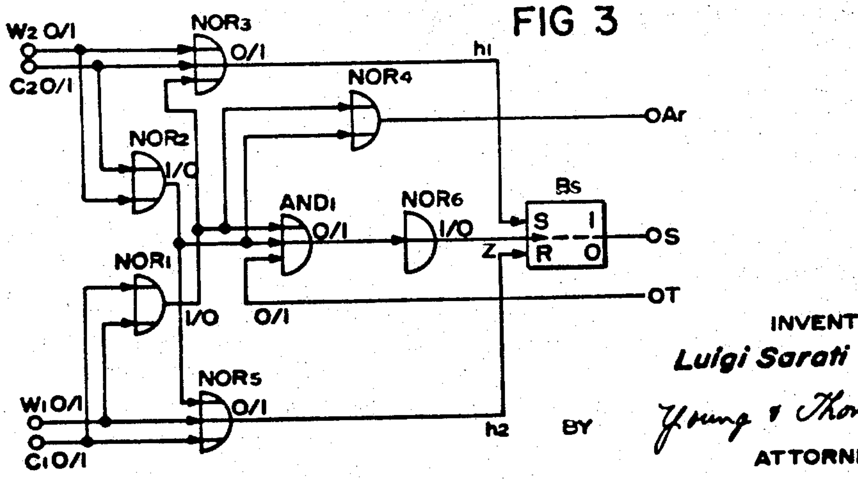
FIGURE 3 represents the block diagram of the preferred embodiment of the computer ET used in transmission (only for "isofrequency" connections).

FIGURE 3 is a block diagram of the preferred computer's circuit. The computer ET is a circuit with five inputs $W_1$, $C_1$, $W_2$, $C_2$ and T, and three outputs $h_1$, $h_2$ and Z—the latter being connected to the input of a bistable $B_s$, whose single output is connected to the antenna $A_1$'s switch unit $K_r$. The computer is made up of seven logical units, of which six are "NOR" and one is "AND," these circuit elements being well known in the art.

Three of these logical units have two inputs and one output (NOR 1, 2, 3); two other units (NOR 3, 5) and the AND unit have three inputs and one output, while the unit (NOR 6) has only one input and one output. To explain the operation of the computer ET, one of the three situations that may occur in an isofrequency connection will now be described. Suppose, for instance, that the transmitter $TR_1$ stops working, while the $TR_2$ is still efficient (reserve). There will be signal changes at one of the four computer inputs. The lack of power W or the lack of the television signal C will have the same effect on the computer output, i.e., alarm, since W and C have the same importance. If the $TR_1$ power is missing, the input $W_1$, which was in the normal "0" condition, will change to a "1" status, i.e., from ground to a positive polarity. Hence, the NOR 1 output status will change from the inhibited to the conductive state, producing the "0" condition in the first input of NOR 4 and AND 1.

At this point, either of two conditions may be present: the other two ET inputs, $W_2$ and $C_2$, will remain in their former "0" condition, or one of the two will change to a "1" status. An assumed, however, only one of the two transmitters is in alarm, and there will be no change in the conditions of $W_2$ and $C_2$. Therefore, the first and second inputs of NOR 3 will remain in the "0" condition, while the third input changes from "1" to "0" As all three NOR 3 inputs are now "0," the NOR output will change to a "1" condition and $h_1$ will become "1" to control the bistable device $B_s$. The latter $B_s$, acting on the switch unit connected to its output S, will bring about the switching of the antenna $A_1$ onto the efficient channel.

Assuming now that the breakdown of transmitter 1 (in supply) has not been signaled by the control units, so that the $W_1$ and $C_1$ signals have remained at 0; the AND 1 unit will not allow its output to action NOR 6 until there is a "1" condition on its third input; such a condition leads to T, an alarm signal. This is sent from the receiving station "R" through the channel indicated in FIGURE 1 with the transmitting unit TRA, the transformers $A'_1$ and $A'_2$ of the transmitting and receiving antennas and finally with the receiving unit RIC. This signal is sent every time an anomaly in the incoming signal is noted in R (e.g. a drop in the level of the received signal), an anomaly that lasts longer than is required for the intervention of the processor ET. Error systems of this type are well known in the art. When the telesignal T appears, the third input of AND 1 goes to "1" and AND 1 is actioned, inverting the Z output of NOR 6 which, through the bistable device $B_s$, will cause a switch of the $A_1$ antenna. The telesignal T has been introduced here to prevent the supply from having a continuous interruption. In fact, it is possible for a breakdown in the control units to prevent the alarm condition from being noted—even though the supply transmitter has broken down—and thus the computer would not order the switching operation in transmission. In this case, the terminal receiving station, with an interruption in supply lasting longer than a pre-established time, will send out a T telesignal to the distant transmitting station. This telesignal T (FIG. 1) will change the condition of AND 1 in the ET computer, i.e., at its third input; its "0" condition will change to "1." Then, if the other two AND 1 inputs show "1" because of the failure to report the alarm condition, the T signal, through NOR 6 will be applied to the third common input of the bistable $B_s$, which will cause the antenna to switch, no matter what the previous position of its switch was.

The bistable device $B_s$ is of the set-reset type with transistors. As its circuit is well known to technicians in the field, it will not be described here. It is only pointed out that the control signals $h_1$ and $h_2$ for the set and reset, can never be applied at the same time since, as can be seen from the relation (2) and (3) hereinabove, $h_1$ and $h_2$ can never have the same polarity (positive). However, the Z signal, which is applied at the same time to the two inputs of the bistable circuit, does change the condition of its output.

While the principles of the invention in question have been described above with reference to a specific example of construction, it must be understood that variations in the circuits can be introduced by qualified technicians (in the overall layout of this transmitting processor) without altering the spirit and the purpose of the invention as defined in the following claims.

What is claimed is:

1. An electronic computer for performing switching operations and alarm operations in a transmitter-receiver system, said system including a first transmitter, a second transmitter, a receiver, a switch responsive to said computer for connecting one of said transmitters to said receiver, an alarm, each said transmitter including power-loss indicating means and continuity-loss indicating means and said receiver including an error indicating means, said computer including means responsive to said power-loss indicating means, said continuity-loss indicating means and said error indicating means to operate one of said switch and said alarm according to Boolean algebra equation:

$$\text{Alarm}=(W_1+C_1)\cdot(W_2+C_2)$$
$$\text{Switch to } TR_2=(W_1+C_1)\cdot(\overline{W_2}+\overline{C_2})$$
$$\text{Switch to } TR_1=(W_2+C_2)\cdot(\overline{W_1}\cdot\overline{C_1})$$

where $W_1$ and $C_1$ are power loss and continuity loss indications for said first transmitter and $W_2$ and $C_2$ are power loss and continuity loss indications for said second transmitter.

2. A device as set forth in claim 1 wherein said switch is switched to the other position thereof responsive to said error indicating signal.

3. A device as set forth in claim 1 wherein said computer comprises a first gate circuit responsive to at least one of a $W_1$ and $C_1$ signal to provide a first output indication, a second gate circuit responsive to at least one of a $W_2$ and $C_2$ signal to provide a second output indication, third gate means responsive to a simultaneous first and second output to operate alarm, fourth gate means responsive to at least one of a $W_1$, $C_1$ and no first output indication to provide a third output indication, fifth gate means responsive to at least one of a $W_2$, $C_2$ and no second output indication to provide a fourth output indication, six gate means responsive to the simultaneous application thereto of said first and second output and said error indicating means to provide a fifth output, said switch being responsive to said third output for placing said switch in a first condition thereof and responsive to said fourth output for placing said switch in a second condition thereof and responsive to said fifth output to alter the condition of said switch.

4. A device as set forth in claim 3 wherein said first, second, third, fourth and fifth gate means are NOR gates and said sixth gate means is an AND gate.

References Cited

UNITED STATES PATENTS

| | | | |
|---|---|---|---|
| 2,655,646 | 10/1953 | Callahan et al. ------ | 340—253 |
| 2,806,944 | 9/1957 | Sheffield et al. ------- | 340—147 |

JOHN W. CALDWELL, *Primary Examiner.*

H. I. PITTS, *Assistant Examiner.*

U.S. Cl. X.R.

340—253